Figure 1:
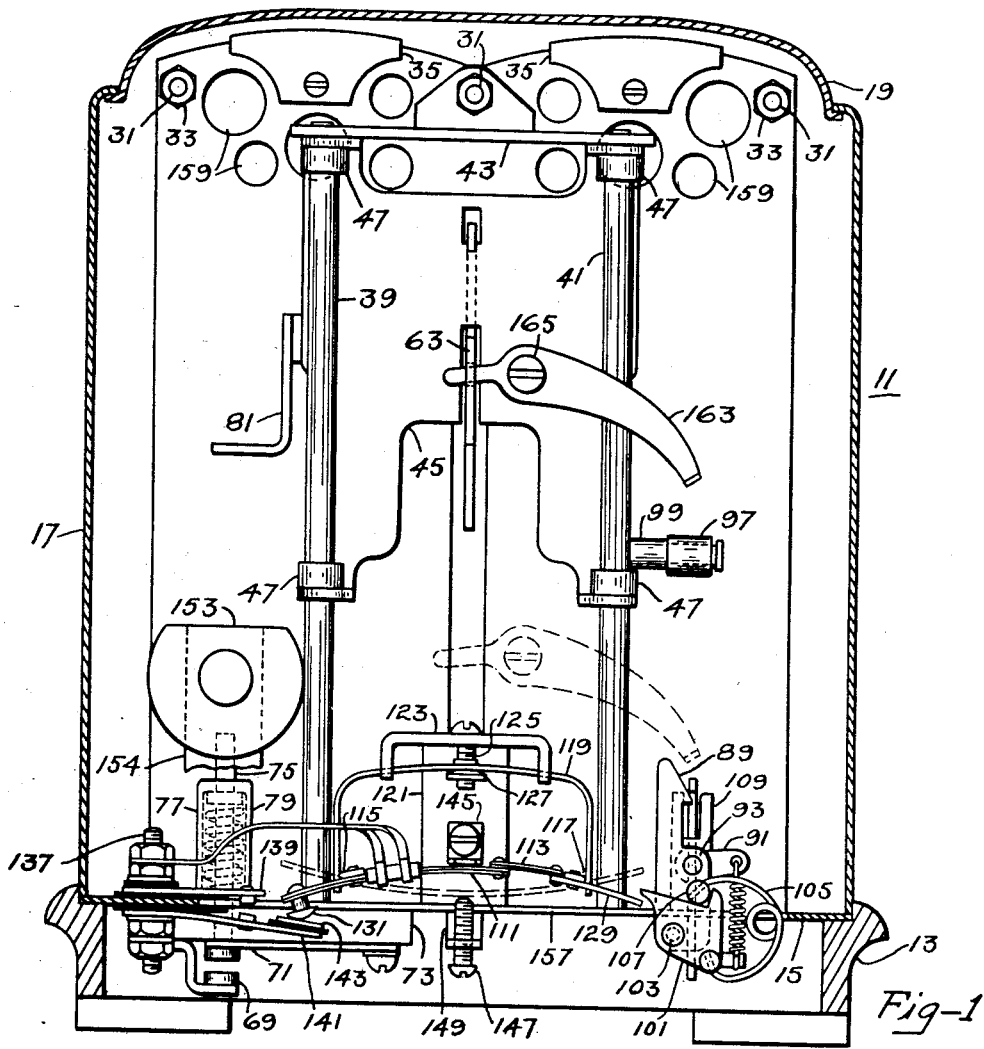

Sept. 2, 1941.  M. IRELAND  2,254,946
THERMAL TIMER FOR AUTOMATIC TOASTERS
Filed July 10, 1939  2 Sheets-Sheet 1

INVENTOR
MURRAY IRELAND
BY
H. M. Bielul
ATTORNEY

Sept. 2, 1941.  M. IRELAND  2,254,946
THERMAL TIMER FOR AUTOMATIC TOASTERS
Filed July 10, 1939  2 Sheets-Sheet 2
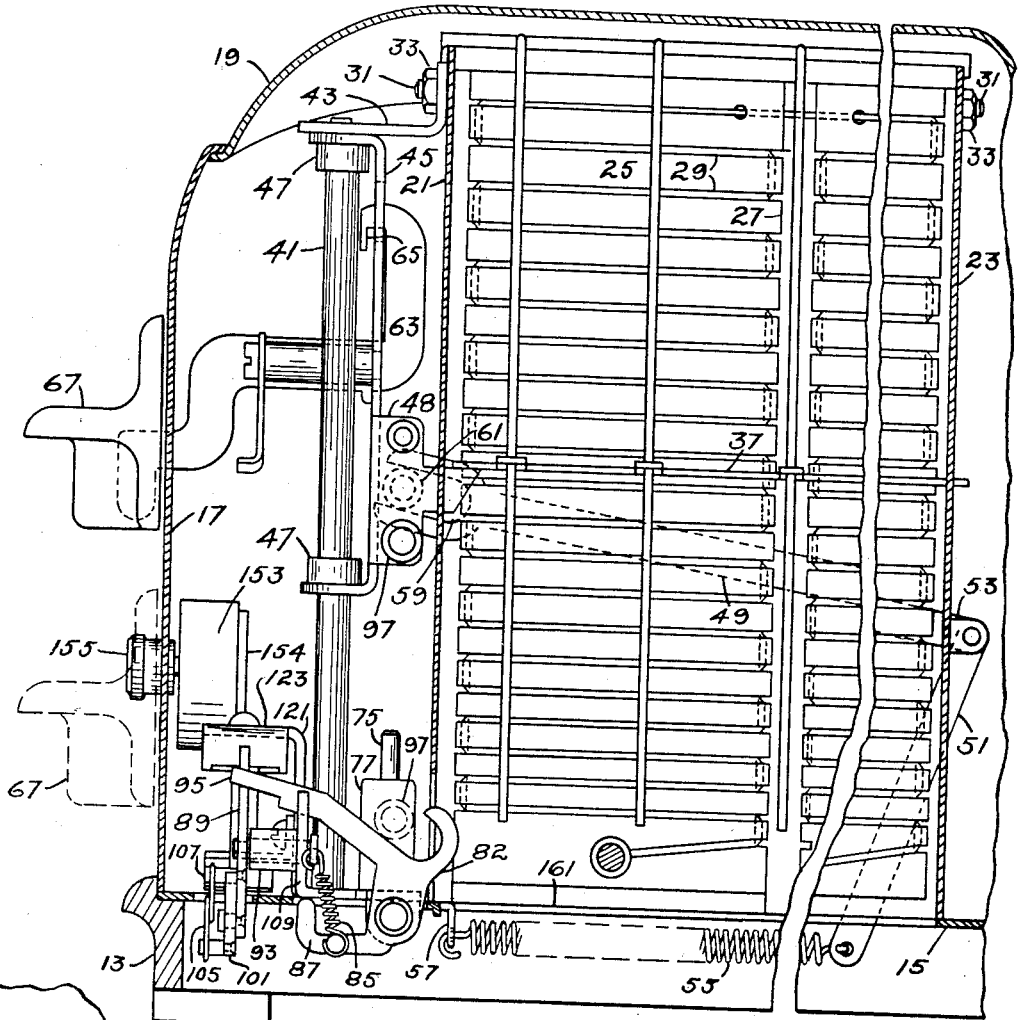
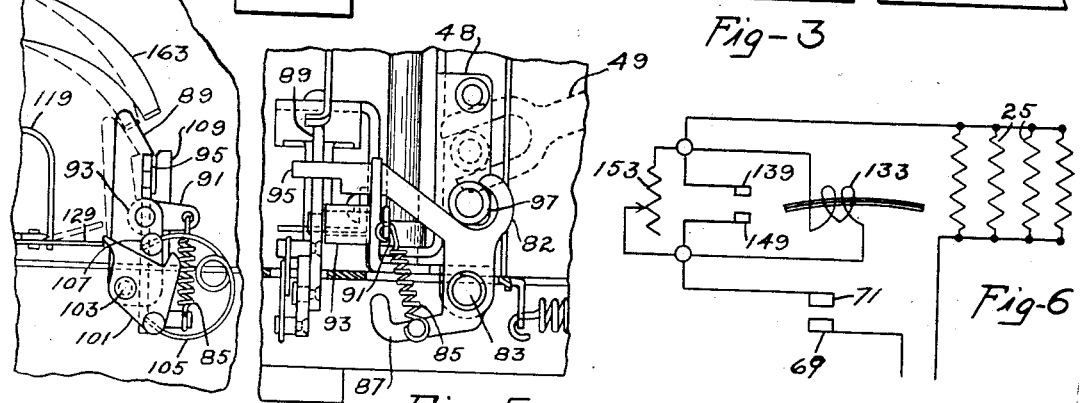
INVENTOR
MURRAY IRELAND
BY
H. M. Biebel
ATTORNEY Patented Sept. 2, 1941

2,254,946

UNITED STATES PATENT OFFICE 2,254,946

THERMAL TIMER FOR AUTOMATIC TOASTERS

Murray Ireland, near Elgin, Ill., assignor to McGraw Electric Company, Elgin, Ill., a corporation of Delaware Application July 10, 1939, Serial No. 283,520

12 Claims. (Cl. 219—19)

My invention relates to electric toasters and particularly to thermal timing means for determining the duration of a toasting operation.

An object of my invention is to provide a relatively simple and efficient thermally controlled timing mechanism for a toaster.

Another object of my invention is to provide a thermal timing mechanism for a toaster comprising a snap-acting bimetal passing through a heat-up cool-off cycle to determine the duration of a toasting operation.

Another object of my invention is to provide a thermal timing mechanism for a toaster comprising a composite snap-acting bimetal bar adapted to insure uniform toasting of successive slices of bread irrespective of changes in the temperature of the toaster.

Other objects of my invention will either be apparent from a description of a preferred form of device embodying my invention or will be pointed out hereinafter in the course of such description and more particularly set forth in the appended claims.

While I have illustrated my invention as applied to a toaster, I do not desire to be restricted to such use as it is obvious that my invention is applicable to other similar devices where short time repetitive operating periods or cycles with varying lengths of intervals therebetween are required.

Figure 2:
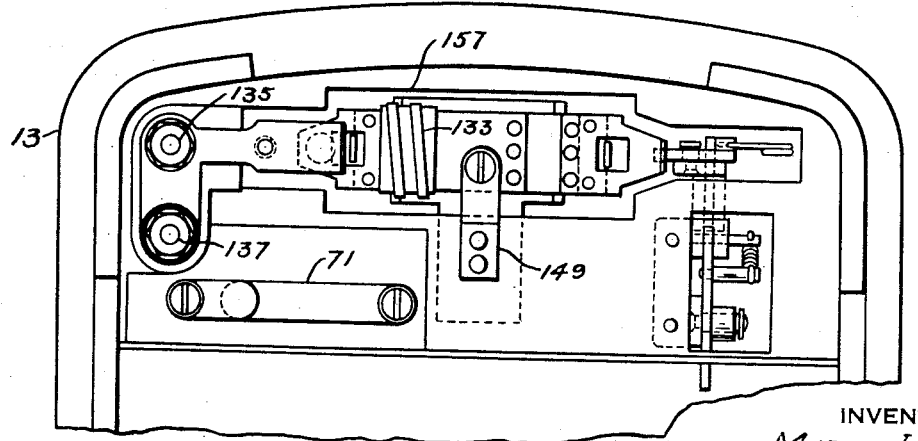

In the drawings:

Figure 1 is a front elevational view of a toaster, with the front casing wall removed, and showing a thermal timer embodying my invention, Fig. 2 is a fragmentary bottom plan view showing the thermal timer, Fig. 3 is a side elevational view with a side wall of the casing removed, the parts being shown in non-toasting position, Fig. 4 is a fragmentary front elevational view of the detent means shown in latching position, Fig. 5 is a fragmentary side elevational view showing the detent parts in toasting position, and, Fig. 6 is a diagram of the electrical connections of the toaster and timer.

An automatic electric toaster 11 includes a skeleton frame 13 which may be made of a moulded composition material and which has a base plate 15 secured to or against its upper surface. A crumb tray not shown in the drawings may also be provided if desired and be secured against the under surface of frame 13. The toaster structure includes also a casing 17 which provides two side walls and a front and a rear wall and which is mounted in any suitable or desired manner against the base plate 15. A cover 19 is also provided and has interfitting engagement with the upper flanged end of the casing 17, all in a manner well known in the art.

The toaster structure includes a front intermediate wall 21, a rear intermediate wall 23 and a plurality of electrical heating elements designated generally by the numeral 25, and I provide a pair of such electric toast heating elements for each slice of bread which is to be simultaneously toasted in a toaster of this kind. While I have illustrated, particularly in Fig. 1 of the drawings, a two-slice toaster, I do not desire to be limited thereto as the parts more particularly embodying my invention can be applied to a toaster adapted to simultaneously toast any other number of slices of bread. The heating elements 25 severally include one or more vertically extending plates of mica 27 and a resistor strip or wire 29 wound thereon, each individual heating element 25 being of generally rectangular planar shape. The lower ends of these heating elements may interfit with the base plate 15 while the upper ends thereof may be held in any suitable or desired manner now well known in the art and reference may here be made to my earlier Pat. No. 2,001,362 for details as to the heating element construction. The upper ends of the front and rear intermediate walls may be held in properly spaced relation by a plurality of rods 31 having nuts 33 at each end thereof and further, these walls may be held apart by upper frame plates 35, all in a manner well known in the art. The lower ends of the walls may interfit with the base plate 15. While Figs. 1 and 3 do not permit of showing bread receiving openings or slots in cover 19 and in frame plates 35, I desire it to be understood that such openings are provided, all as shown in my Pat. No. 2,001,362.

A plurality of bread carriers 37, one positioned between each pair of cooperating heating elements, are provided and have portions extending through slots in the front and in the rear intermediate plates. Means for permitting of vertical movements of the bread carriers 37 may include a pair of spaced vertical standards 39 and 41, the lower end of each of which interfitting with the base plate 15 while the upper ends thereof may interfit with a bracket 43 of substantially L-shape. This bracket may be secured in any suitable or desired manner against the front intermediate wall 21.

A carriage 45 of generally plate-shape may have extensions thereon, each provided with a bushing 47, which bushings are adapted to engage the respective standards 39 and 41 to permit of moving the plate or carriage 45 vertically upwardly and downwardly. The bread carriers 37 may be connected to side portions of the carriage 45 as by intermediate members 48 (see Fig. 3). While I have illustrated and described a specific embodiment of standards and carriage, I do not desire to be limited thereto since any similar construction may be utilized if effective for the same general purpose.

Means for biasing the bread slice supports to the position shown in Fig. 3 of the drawings may include a bell crank lever having a substantially horizontally extending arm 49 and a depending arm 51, the bell crank lever being pivotally mounted as on a bracket 53 secured to the rear intermediate wall 23. The lower end of arm 51 has connected thereto one end of a tension coil spring 55, the other end of which is connected, for example, with a bracket 57 secured to the base plate 15 or in any other suitable manner to provide an anchorage for the forward end of spring 55. The forward end of arm 49 is provided with an enlarged portion having a longitudinal slot 59 therein in which there moves a pin 61 secured in any suitable or desired manner to the carriage plate 45 or to the members 48. A member of generally Z-shape and indicated by numeral 63 has an upper hook-end 65 interfitting with the upper part of carriage 45, a part of member 63 extending through a lower portion of the carriage 45 and forwardly to a short distance in front of the front wall of the casing. An actuating knob 67 is secured on the front end of member 63 so that it is possible for an operator to press downwardly on knob 67 and move the bread carriers downwardly from the non-toasting position shown in Fig. 3 to a lower or toasting position within the toasting chamber which may be constituted by the front and rear intermediate walls, the two outermost planar heating elements, the base plate 15 and the cover 19.

Means for controlling the energization of the plurality of heating elements 25 may comprise a fixed contact member 69 and a movable contact member and arm 71, both of which may be insulatedly supported on a block 73 of electric insulating material secured against the under surface of the base plate 15. A rod 75, which may be made of electric-insulating material, is positioned partly within a tubular member 77, and is biased upwardly in the tubular member by a spring 79, the construction being such that the rod 75 is maintained normally in an upper position substantially as shown in Fig. 1 of the drawings. A rod actuating member 81, of substantially L-shape, may be secured in proper position on the carriage 45 so that when the carriage and the bread carriers are moved downwardly the horizontal portion of member 81 will engage the upper end of rod 75, move the rod downwardly against contact arm 71 causing it to move downwardly and into engagement with fixed contact member 69.

Since it is desired to retain the bread carriers in their lowered or toasting positions for a length of time sufficient for the heating elements 25 to thermally act upon and toast a slice or slices of bread placed within the toaster, I provide a detent means which will now be described. A latch member 82 of substantially T-shape is pivotally mounted as on a pivot pin 83 and a coil spring 85 biases the latch 82 into releasing position substantially as shown in Fig. 3 of the drawings. One end of this spring 85 is connected to an L-shaped portion 87 of member 82 while the other end of spring 85 is connected to a detent 89 and particularly to an arm 91 thereof, the detent 89 being of generally L-shape and pivotally mounted at 93 as shown clearly in Figs. 3 and 5 of the drawings. A substantially horizontally extending portion 95 of member 82 may engage under a hook portion in the upper end of an arm on detent 89.

Means on the carriage 45 and particularly on one of the rearward extensions 48 thereof for engaging with the detent member 82 may have the form of a roller 97 rotatably mounted on a pin or stub shaft 99. The construction of these parts is such that when the bread carriers are moved downwardly into toasting position, the roller 97 engages a rear portion of arm 95 (as shown by the broken lines of member 97 in Fig. 3) this engagement causing turning movement of member 82 in a counter-clockwise direction until the roller 97 occupies the position shown in Fig. 5 of the drawings under a hook portion of latch member 82. In this position arm 95 has engaged under the projection on detent 89 which detent is biased by spring 85 in a clockwise direction so that now arm 95 and therefore the detent member 82 are prevented from turning movement in a clockwise direction.

The lower end portion of detent 89 has pivotally mounted thereon a small plate 101 as on a pin 103 to constitute what may be called an overrunning clutch. Plate 101 is biased in a counter-clockwise direction by a spring 105 connected at one end thereof to a lower point on plate 101 and having its other end connected to a stop pin 107 which latter is positioned near to the pivot pin 93.

The pivot pin 93 is supported by a bracket 109 secured to the base plate 15 and the turning movement of detent 89 is limited by engagement of arm 91 with a part of bracket 109.

Means for determining the duration of a toasting operation of my toaster includes a snap-acting compensated bimetal structure including a main bimetal bar 111 having secured thereto at one end thereof a compensating bimetal bar 113 which latter is shorter than is bar 111 and which, in a manner well known in the art, tends to counteract the movement of main bar 111 in response to temperature changes. Generally this is effected by locating the high expansion component of the auxiliary bar on the opposite side to that on which the high expansion component of main bar 111 is located. The main bar 111 may have secured thereto a knife edge member 115 and the auxiliary bar 113 may have secured thereto a knife edge member 117 which knife edge members are adapted to engage and fit tightly within a resilient frame 119 of generally C-shape. The member 119 supporting the compound thermostat including bars 111 and 113 is adjustably supported in a bracket 121 having a part extending vertically upwardly from the base plate 15 and including also a portion 123 of substantially C-shape extending forwardly over portion 121 as shown more particularly in Fig. 3 of the drawings. An adjusting screw 125 extends through portion 123 and frame 119 and a nut 127 on the screw 125 cooperates with portion 123 to vary the distance between the lower ends of member 119 to thereby compress to a greater or to a lesser extent the compound bimetal bar comprising portions 111 and 113 whereby this thermostat is initially compressively stressed and bowed in the manner shown in Fig. 1 of the drawings.

Portion 113 of the thermostat structure has secured thereto an extension 129 overhanging the point of support of the thermostat structure, as seen more particularly in Fig. 1 of the drawings, the outer end of extension 129 moving past the over-running clutch 101 hereinbefore described in a manner to be hereinafter set forth in detail.

The main portion 111 of the bimetal structure may also overhang the point of engagement of knife edge member 115 and the support 119 and may have secured thereon a lug 131 shown in Fig. 1 of the drawings.

An auxiliary electric heater 133 is insulatedly mounted on main bimetal bar 111 adjacent to the left hand support of the thermostat structure and the end portions of the heater 133 extend to contact terminals 135 and 137 insulatedly supported on base plate 15. One of these terminals is provided with a substantially fixed contact arm 139 while the other is provided with a resilient movable contact arm 141, which latter is provided with a striker plate 143 insulatedly mounted thereon to be engaged by lug 131.

The construction and arrangement of the composite thermostatic bar is such that when it is relatively cold it is in an initially upwardly bowed position as shown in Fig. 1 of the drawings. The upward bowing of this thermostat structure is limited by a stop member 145 while the downward bowing of the composite thermostat is limited by an adjustable set screw 147 mounted in a bracket 149 fixedly secured, for example, to base plate 15. The composite bimetal thermostat, when heated as by energization of the auxiliary heater 133, will move into its oppositely bowed position shown by the broken lines in Fig. 1, with a snap action when it has been heated to a predetermined high temperature. When the composite thermostat structure snaps over, the extension 129 may move past the over-running clutch member 101 whereby detent 89 is prepared for releasing movement when the thermostat structure has cooled to a predetermined lower temperature and has snapped back to its initially bowed position. The cooling of the thermostat structure is caused by the action of contact arms 139 and 141 controlled by the overhanging portion of bimetal 111 and particularly the lug 131 which is moved upwardly or in a clockwise direction when the thermostat structure is bowed downwardly. Lug 131 is thus moved out of engagement with arm 141 which flexes in a counter-clockwise direction until it engages contact arm 139 to thereby short circuit auxiliary heater 133.

Means for varying the time required to raise the temperature of the thermostat structure to the predetermined high value at which it will snap over into its oppositely bowed position may comprise a small manually adjustable rheostat 153 which is shown as mounted on a bracket 154 inside of the front wall of the casing 17 suitably supported on the base plate 15, a knob 155 being provided to adjust the rheostat, which knob is positioned in front of the casing. It is obvious that if the rheostat 153 be connected, for example, in shunt with the auxiliary heater 133, and if the auxiliary heater 133 be connected, for example, in series circuit relation with the main heaters 25, the full effect of the current flowing through the toaster will be had in the resistor 133 if no part of rheostat 153 is connected in shunt circuit with the auxiliary resistor heater 133. In accordance with the amount of resistance of the rheostat in circuit and in accordance with its decrease, the amount of current flowing through the resistor 133 is decreased and therefore the time required to cause a rise of temperature of the composite thermostat structure to the value required to cause it to move into its oppositely bowed position is increased, thereby varying the heat-up period of the thermal timer. Other means may also be used to vary the time of heat-up of the thermostat, instead of the one described, and one such means may comprise manual adjustment of screw 125.

I have found it possible to obtain very satisfactory operation as to uniform toasting of successive slices of bread, by positioning the bimetal thermostat structure immediately above an aperture 157 provided in the base plate 15 to thereby permit influx of cool air into the toaster structure and more particularly into the mechanism chamber which is that part between the front wall of the casing 17 and the front intermediate wall 21. I provide a plurality of apertures 159 in the upper part of the front intermediate wall 21 so that a chimney effect may be caused by the main toast heating elements 25 which cause a through draft of cooling air through openings 161 in the base plate 15 registering with the spaces between the pairs of heating elements adapted to affect a slice of bread, this air flowing upwardly and out through the bread receiving openings hereinbefore described.

I provide further a relatively simple manual release means in the form of a lever arm 153 which is pivotally mounted intermediate its ends but closer to one end than to the other, as by a pivot pin 165 on carriage 45. The short end of arm 163 has interfitting engagement with a part of lever arm 63 which, as has been hereinbefore described, is pivotally hung on carriage plate 45. The position of release lever 163 when the bread carriers are in their toasting position is shown in full lines in Fig. 4 of the drawings and in broken lines in Fig. 1 of the drawings. When the operator presses upwardly on knob 67, the right-hand end of lever 163 is moved into engagement with the angularly extending right-hand edge of detent 89, which latter is moved in a counter-clockwise and releasing direction. arm 163 and detent 89 being moved into the position shown by the broken lines in Fig. 4 of the drawings. Detent 89 is therefore moved out of engagement with arm 95 and the upward pressure by roller 97 on the hooked end of latch member 82 causes a slight turning of member 82 in a clockwise direction whereby roller 97 is released and spring 55 causes upward movement of the carriers to non-toasting position which upward movement is accompanied by disengagement of main contact members 69 and 71.

I have found that a thermal timer of the kind herein shown and described is effective to control the duration of successive toasting operations to make uniformly toasted slices of bread irrespective of the intervals occurring between successive toasting operations and also irrespective of variations in the energizing voltages.

While I have illustrated and described a composite thermostat structure including a main bimetal portion 111 and an auxiliary and compensating portion 113 I do not desire to be limited thereto since I may use in place thereof the compensated snap-acting bimetal structure disclosed and claimed in my copending application S. N.

280,284 filed June 21, 1939, and assigned to the same assignee as is the present application. One of the essentials of the snap-acting thermostat structure is that it shall have two longitudinally extending overhanging portions which portions move in the opposite direction to that in which the mid-portion of the bowed thermostat structure moves to obtain the actions already hereinbefore set forth.

While I have illustrated and described a specific embodiment of my invention, I do not desire to be limited thereto since obvious modifications may be made therein, all of which are to be considered as covered in the appended claims.

I claim as my invention:

1. In an automatic electric toaster comprising a toasting element, a bread carrier movable into toasting and non-toasting positions relatively to the toasting element and yieldingly biased to non-toasting position, means to move said carrier to toasting position and detent means to hold the carrier in toasting position, that improvement in detent releasing means comprising temperature responsive means including a main and a compensating bimetal bar secured together, means for supporting said bimetal bars at two spaced points to cause them to have an initially bowed shape, means controlled by the main bimetal bar to cause heating and then cooling of said bimetal bars to cause them to move across an axis of pressure into an oppositely bowed position with a snap action and then back to their initial positions, and means carried by said bimetal bars outside of said spaced supporting points mechanically engaging said detent to cause release thereof during one of said movements of said bimetal bars.

2. A device as set forth in claim 1 in which the means for heating said bimetal bars comprises an electric resistor insulatedly mounted on said main bimetal bar, the heating of said compensating bar being effected by conduction from said main bimetal bar.

3. In an automatic toaster, the combination with a casing, a main electric heating element therein, a control switch for the main heating element biased to open position, means to effect closing of the switch and detent means to hold said switch in closed position, of means adapted to effect release of detent means after a time interval after closing of said switch, said detent release means including a snap acting bimetal bar structure supported in a normally bowed shape in the toaster out of direct heat receiving relation with the main heating element, an auxiliary electric heating element carried by said bimetal bar structure adapted to thermally affect said bimetal bar and cause it to snap over into oppositely bowed shape on predetermined increase of temperature, switch means actuable by one end portion of the bimetal bar to deenergize said auxiliary electric heating element and operable by movement of the bimetal bar structure into oppositely bowed shape, said bimetal bar structure being adapted to return to substantially its initial position on predetermined decrease of temperature and means actuated by the other end portion of the bimetal bar structure during its return movement to act on and release said detent means.

4. A toaster as set forth in claim 3 in which the deenergization of the auxiliary heating element is effected by a short circuiting switch biased to closed position and normally held in open position by the bimetal bar when in its initial position, movement of the bimetal bar to its oppositely bowed shape causing closing of the short circuiting switch.

5. A toaster as set forth in claim 3 in which the bimetal bar comprises a main portion adapted to move into oppositely bowed shape on predetermined increase of its temperature and an auxiliary shorter portion so related to the main portion as to cause the main portion to move into oppositely bowed position at less than said predetermined increase of temperature.

6. A toaster as set forth in claim 3 in which the bimetal bar comprises a main portion adapted to move into oppositely bowed position when the temperature has been increased a certain value and an auxiliary portion adapted to cause the bimetal bar to move into oppositely bowed position when the temperature has been increased less than said certain value and in which the auxiliary heating element is mounted on the main portion of the bimetal bar structure toward that end thereof away from the auxiliary portion.

7. In an automatic electric toaster comprising toast heating elements, means to initiate a toasting operation and means to terminate a toasting operation after a time interval the length of which decreases with increase of toaster temperature to insure substantially uniform toasting of successive slices of bread, said terminating means including a compound snap acting bimetal bar structure, an adjustable U-shaped support for said bar structure engaging the same at two points within the two ends thereof, an auxiliary electric heater on the bimetal bar structure, a control switch for said auxiliary electric heater normally held in auxiliary heater energizing position by an overhanging end portion of the bimetal bar structure to cause the bar structure to move away from its initial position and cause deenergization of the auxiliary heater, cooling of the bar structure and return thereof to its initial position to determine the length of a time interval of operation, said bimetal bar structure comprising a main bimetal portion and a relatively short auxiliary bimetal portion secured to each other in longitudinally-alined positions, said auxiliary bimetal portion being adapted to reduce said time interval with increase of toaster temperature.

8. A device as set forth in claim 1 and including a lever arm pivotally mounted on said carrier and manually actuable by said carrier moving means to engage and release said detent.

9. In an automatic electric toaster comprising a main toasting element, a bread carrier movable into toasting and non-toasting positions relatively to the toasting element and yieldingly biased to non-toasting position, means to move the carrier into toasting position, a detent to hold the carrier in toasting position, the improvement in detent releasing means comprising an initially-bowed snap-acting compensated bimetal thermostat structure, an adjustable two-point support for said thermostat structure operatively engaging the same within the ends thereof, an auxiliary electric heater in heat-transmitting relation to said bimetal thermostat, a control switch for said auxiliary heater, extensions on said thermostat structure at each end thereof overhanging the supports, one of said extensions controlling the auxiliary heater control switch and the other extension controlling the detent, means for energizing said auxiliary electric heater simultaneously with the movement of the bread carrier into toasting position to raise the temperature of the bimetal thermostat and to cause it to move quickly to an oppositely bowed position when heated to a predetermined temperature, said one extension causing closing of the auxiliary heater control switch to deenergize said heater, said bimetal bar then cooling and returning into its original bowed position when it has cooled to a second predetermined temperature, said other extension being effective during such return movement to effect release of said detent.

10. In a toaster, the combination with a casing having ventilating openings in the bottom and in the top wall thereof, electric heating means in the casing, an intermediate wall between the casing and the heating means dividing the space within the casing into a toasting chamber and a mechanism chamber, a bread carrier in the toasting chamber movable into toasting and non-toasting positions relatively to the heating means, means to move the bread carrier into toasting position and detent means to hold it in toasting position, of detent-releasing means including a normally bowed bimetal bar structure, a resilient supporting member engaging said bimetal bar structure at two spaced points within the ends of said structure, an auxiliary electric heater insulatedly mounted on said bimetal bar structure, a control switch for said auxiliary heater biased to heater-deenergizing position and normally held in heater-energizing position by one end portion of the bimetal bar structure extending beyond a supported point, the bimetal bar structure moving to an oppositely bowed position on being heated to a given temperature, causing the auxiliary heater control switch to move to deenergizing position and then cooling and moving to its initial bowed position and causing the other end portion of the bimetal bar structure to engage the detent means and move it to carrier releasing position, the bimetal bar structure being located in the mechanism chamber and subject to a through draft of cooling air caused by the electric heating means.

11. In an automatic electric toaster comprising a toast heating means, a bread carrier movable into toasting and non-toasting positions relatively to the heating means and yieldingly biased to non-toasting position, means to move the carrier to toasting position, a detent to hold the carrier in toasting position and a detent-holding means, the improvement in detent-releasing means comprising a bowed bimetal bar structure, an adjustable resilient holding means engaging said bimetal bar structure at two spaced points inside of the ends of the bar structure, an auxiliary electric heater insulatedly mounted on said bimetal bar structure, a control switch for the auxiliary heater biased to heater-deenergizing position and normally engaged by one overhanging end portion of the bimetal bar structure to hold the switch in heater-energizing position to cause heating of the bimetal bar structure and then cooling thereof with movement thereof out of and then back to its initial position, the other overhanging end portion of the bimetal bar structure being effective during the return movement of the bimetal bar structure to engage the detent-holding means and move it to detent-releasing position.

12. In an automatic electric toaster comprising toast heating elements, a control switch therefor normally yieldingly biased into open position, means to move the switch to closed position and a detent to hold the switch in closed position, that improvement in detent releasing means comprising temperature responsive means including a main and a compensating bimetal bar secured together in longitudinal alinement with each other, means for supporting said bimetal bars at two spaced points to cause them to have an initially bowed shape, means controlled by the main bimetal bar to cause heating and then cooling of said bimetal bars to cause them to move across an axis of pressure into an oppositely bowed position with a snap action and then back to their initial positions and means carried by said bimetal bars outside of said spaced supporting points mechanically engaging said detent to cause release thereof during one of said movements of said bimetal bars.

MURRAY IRELAND.